(12) United States Patent
de Souza Lima et al.

(10) Patent No.: US 9,361,132 B2
(45) Date of Patent: Jun. 7, 2016

(54) SYSTEM AND METHOD FOR PROVIDING APPLICATION-BASED USER INTERFACE FEATURES ON A COMPUTING DEVICE

(75) Inventors: Jose de Souza Lima, San Francisco, CA (US); Le Chen, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 13/172,096

(22) Filed: Jun. 29, 2011

(65) Prior Publication Data

US 2012/0200586 A1  Aug. 9, 2012

Related U.S. Application Data

(60) Provisional application No. 61/440,849, filed on Feb. 8, 2011.

(51) Int. Cl.
*G06F 3/048*  (2013.01)
*G06F 9/44*  (2006.01)
*G06F 3/0481*  (2013.01)

(52) U.S. Cl.
CPC ............ *G06F 9/4443* (2013.01); *G06F 3/0481* (2013.01)

(58) Field of Classification Search
CPC .............................. G06F 9/4443; G06F 3/0481
USPC ........................................... 715/764, 582, 589
See application file for complete search history.

(56) References Cited

U.S. PATENT DOCUMENTS

| | | | | |
|---|---|---|---|---|
| 5,905,492 A * | 5/1999 | Straub et al. | .................. | 715/744 |
| 5,917,487 A * | 6/1999 | Ulrich | ............................ | 715/765 |
| 5,959,624 A * | 9/1999 | Johnston et al. | ............. | 715/746 |
| 6,188,399 B1 * | 2/2001 | Voas et al. | ...................... | 715/723 |
| 6,208,988 B1 * | 3/2001 | Schultz | ............. | G06F 17/30616 |
| 6,664,981 B2 * | 12/2003 | Ashe et al. | ..................... | 715/765 |
| 6,731,310 B2 * | 5/2004 | Craycroft et al. | ............. | 715/765 |
| 6,753,890 B2 * | 6/2004 | Sanbe | ........................... | 715/788 |
| 6,762,767 B2 * | 7/2004 | Evans et al. | .................... | 345/581 |
| 6,791,581 B2 * | 9/2004 | Novak et al. | ................... | 715/744 |
| 6,873,337 B1 * | 3/2005 | Fernandez et al. | ............ | 345/581 |
| 6,886,135 B2 * | 4/2005 | Fernandez et al. | ............ | 715/762 |
| 6,920,606 B1 * | 7/2005 | Jablonski et al. | ............. | 715/202 |
| 6,986,107 B2 * | 1/2006 | Hanggie et al. | ............... | 715/815 |
| 6,992,681 B2 * | 1/2006 | Evans et al. | .................... | 345/581 |
| 6,996,287 B1 * | 2/2006 | Weiss | ............................. | 382/260 |
| 7,007,238 B2 * | 2/2006 | Glaser | ........................... | 715/765 |

(Continued)

OTHER PUBLICATIONS

10 Wallpaper Changer Apps for Your BlackBerry by Kyle McInnes, available at blackberrycool.com as of Dec. 2, 2010.*

(Continued)

*Primary Examiner* — William Bashore
*Assistant Examiner* — Nathan Shrewsbury
(74) *Attorney, Agent, or Firm* — Paradice and Li LLP (57) ABSTRACT

A system and method for operating a mobile computing device is disclosed. Each of a plurality of applications that are stored or installed in the mobile computing device is associated with a corresponding design scheme. A user interface feature is displayed on the display of the mobile computing device. The user interface feature is present independent of the operation of the plurality of applications. A change in the state of an application is detected and the appearance of the user interface feature is affected based on the design scheme associated with the application that is changed in state.

16 Claims, 6 Drawing Sheets

(56) References Cited

U.S. PATENT DOCUMENTS

| | | | |
|---|---|---|---|
| 7,017,117 B2* | 3/2006 | Capps | 715/767 |
| 7,137,069 B2* | 11/2006 | Abbott et al. | 715/744 |
| 7,519,914 B2* | 4/2009 | Fernandez et al. | 715/762 |
| 7,543,235 B2* | 6/2009 | Novak et al. | 715/744 |
| 7,613,957 B2* | 11/2009 | Cummins et al. | 714/57 |
| 7,694,229 B2* | 4/2010 | Stoakley et al. | 715/762 |
| 7,884,833 B2* | 2/2011 | Klassen et al. | 345/593 |
| 7,987,431 B2* | 7/2011 | Santoro et al. | 715/765 |
| 8,069,136 B2* | 11/2011 | Tzruya et al. | 706/62 |
| 8,259,129 B2* | 9/2012 | Klassen et al. | 345/593 |
| 8,271,333 B1* | 9/2012 | Grigsby et al. | 705/14.73 |
| 8,285,732 B2* | 10/2012 | Danninger | 707/758 |
| 8,301,893 B2* | 10/2012 | Brundage | 713/176 |
| 8,306,969 B2* | 11/2012 | Beaudreau | G06F 17/30867 707/722 |
| 2002/0149629 A1* | 10/2002 | Craycroft et al. | 345/861 |
| 2003/0076357 A1* | 4/2003 | Glaser | G06F 3/03543 715/765 |
| 2003/0231204 A1* | 12/2003 | Hanggie et al. | 345/744 |
| 2004/0233209 A1* | 11/2004 | Evans et al. | 345/581 |
| 2005/0240983 A1* | 10/2005 | Peters | G06F 3/0481 726/1 |
| 2007/0094597 A1* | 4/2007 | Rostom | G06F 3/0482 715/700 |
| 2007/0257933 A1* | 11/2007 | Klassen | G06T 11/001 345/593 |
| 2008/0148157 A1* | 6/2008 | Kamdar et al. | 715/747 |
| 2008/0155060 A1* | 6/2008 | Weber | G06F 17/3089 709/218 |
| 2009/0313550 A1* | 12/2009 | Kim | G06F 17/30 715/744 |
| 2011/0252344 A1* | 10/2011 | van Os | G06F 9/4443 715/763 |
| 2014/0037200 A1* | 2/2014 | Phillips | G06T 7/408 382/162 |

OTHER PUBLICATIONS

The Microsoft windows task bar as described at http://windows.microsoft.com/en-us/windows/taskbar-overview#1TC=windows-7 as of May 30, 2006 (Microsoft). pp. 1-6.*

* cited by examiner

SYSTEM AND METHOD FOR PROVIDING APPLICATION-BASED USER INTERFACE FEATURES ON A COMPUTING DEVICE

RELATED APPLICATIONS

This application claims the benefit of priority under 35 U.S.C. 119(e) to Provisional Application Ser. No. 61/440,849, filed Feb. 8, 2011, titled SYSTEM AND METHOD FOR PROVIDING APPLICATION-BASED USER INTERFACE FEATURES ON A COMPUTING DEVICE, which is incorporated herein by reference in its entirety.

BACKGROUND OF THE INVENTION

Computing devices are used for a variety of different purposes. For example, a user may use a computing device to read and send emails, send text messages, make phone calls, schedule appointments, play games, listen to music, or perform other tasks. Users may also download or purchase other applications to extend the functionality of their computing devices.

To help organize the various features and functionalities of the computing device, including the downloaded and stored applications, many devices include a home screen and/or other user interface features to efficiently provide a user with different information. For example, a computing device may provide a user with an application bar for launching or opening applications. With the number of applications that are provided on computing devices increasing, an efficient way to provide various information to a user is needed. Furthermore, having aesthetically pleasing features that are unique and different are important to marketing a device.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Embodiments described herein include a system and method for operating a computing device and displaying a user interface feature on the display of the computing device. More specifically, embodiments include automatically affecting the appearance of a displayed user interface feature in response to a change in the state of an application. In this way, the user interface feature may continuously change colors and/or appearance when a user access or operates a variety of different applications.

According to embodiments, a user may launch or open one or more applications that operate on a computing device. Depending on the state of the one or more applications, the appearance of one or more user interface features may be altered or modified. The different states of the applications may correspond to whether the user has launched or opened the application, or is actively and currently using the application. In some instances, the color or design of the user interface feature may be automatically be changed to match a design scheme of an application that has a change in state.

In some embodiments, each of the plurality of applications that are installed or stored in the computing device is associated with a corresponding design scheme. The plurality of applications may be provided with the computing device or be provided by a third party developer and downloaded by a user (e.g., purchased from an application store). Depending on the application, the design scheme may be selected by a user or by a third party developer of the application. In some cases, an application may have a default design scheme, but may be changed in response to a user input.

In one embodiment, a user interface feature is displayed on the display of the computing device. For example, according to some embodiments, the user interface feature may be a status or notification bar, or an application bar comprising a plurality of application objects (e.g., a graphic image or icon representing an application). The user interface feature is displayed independent of the operation of the plurality of applications. For example, the user interface feature may be displayed whether or not there are applications currently being used or accessed by a user.

As discussed, in some embodiments, each of the applications are associated with a corresponding design scheme. This includes applications that are created or designed by a third party developer. The developer of the third party application is enabled to also generate a design scheme (e.g., select the appearance) for the user interface feature.

According to some embodiments, a change in the state of an application is detected. The change in state may be caused by a user operating the computing device. The user may alter the state of an application by (i) launching or opening the application that is currently not being used, (ii) bringing the application that has been opened, but not being used, into focus, or (iii) actively using the application. In other embodiments, some applications may change state upon an event occurrence with relation to the application (e.g., upon receiving a new text message or email).

In response to detecting the change in the state of an application, the appearance of the displayed user interface feature may be automatically altered or modified. The appearance is affected based on the design scheme associated with the application that has changed state. For example, the appearance of the user interface feature may be changed to match or complement the design scheme of the application.

In the various embodiments described, each of the plurality of applications are associated with a corresponding design scheme by assigning each of the applications to a particular pattern, shading, and/or color. In other embodiments, each of the applications may also be assigned a particular color or hue.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources, including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances, laptop computers, or other computing devices. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Overview

Figure 1:
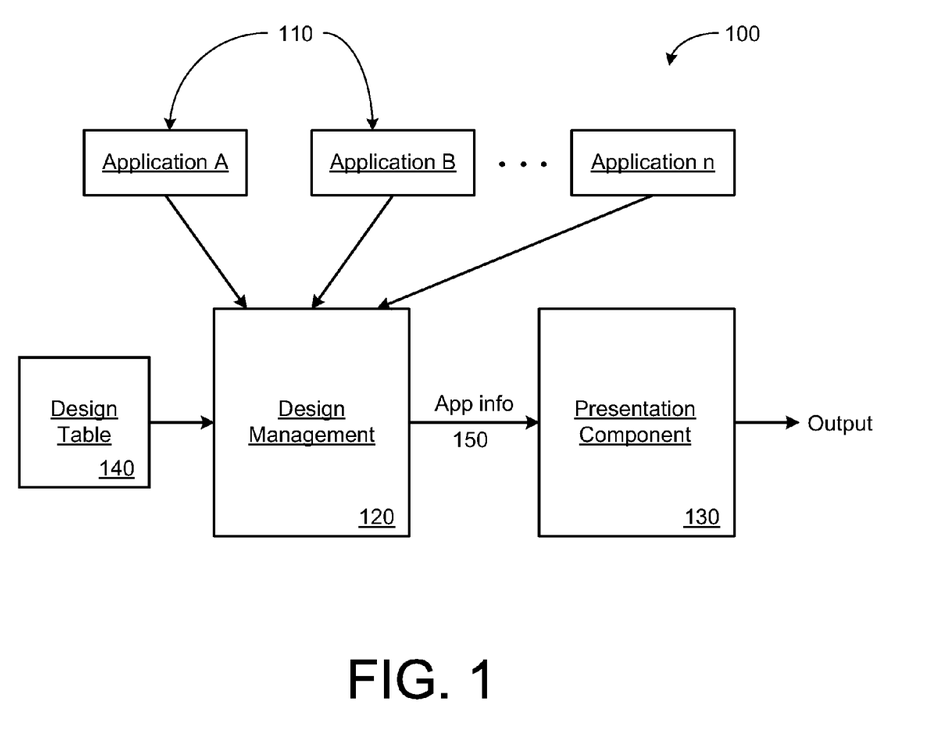
FIG. 1 illustrates a system for operating a computing device under an embodiment.

FIG. 1 illustrates a system for operating a computing device under an embodiment. A system such as illustrated with FIG. 1 may be implemented on, for example, a computing device, although embodiments may be implemented on numerous other computing form factors. In an embodiment, system 100 causes a displayed user interface feature to automatically alter its appearance depending on different applications that are opened or being used by a user. The user interface feature's appearance is changed based on the design scheme of the application. The user interface feature, whose appearance can automatically be changed depending on a state of the application, can be aesthetically pleasing and at the same time, efficiently provide functionality to the computing device.

As examples, the computing device may correspond to any device that includes roaming wireless network and/or telephony capabilities, including cellular telephony devices and/or mobile messengers. In particular, embodiments described herein may apply to numerous kinds of mobile or small form-factor computing devices. Some types of mobile computing devices that may be configured to include embodiments described herein includes a computer telephony device, such as a cellular phone or multi-functional telephony/messaging device with voice-telephony applications (sometimes called "smart phone") or a tablet device. A tablet device is a display dominant computing device (e.g., a device that is typically larger than a smart phone). A computing device such as described may be small enough to fit or carry in one hand, while providing cellular telephony features in combination with other applications, such as messaging, web browsing, media playback, personal information management (e.g., such as contact records management, calendar applications, tasks lists), image or video/media capture and other functionality. Computing devices in particular may have numerous types of input mechanisms and user-interface features, such as keyboards or keypads, mufti-directional or navigation buttons, application or action buttons, and contact or touch-sensitive display screens. Some devices may include combinations of keyboard, button panel area, and display screen on one facade. The button panel region may occupy a band between the keypad and the display area, and include a navigation button and multiple application buttons or action buttons.

Specific types of messaging that may be performed include messaging for email applications, Short Message Service (SMS) messages, Multimedia Message Service (MMS) messages, and proprietary voice exchange applications (such as SKYPE). Still further, other types of computing devices contemplated with embodiments described herein include laptop or notebook computers, ultra-mobile computers, personal digital assistants, and other multi-functional computing devices or mobile/portable devices.

Still further, one or more embodiments may be implemented through any type of computing device such as a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System (PSTN)) and provide software interfaces and applications.

According to an embodiment, the system 100 comprises a design management component 120 and a presentation component 130. The design management component 120 communicates with a plurality of applications 110 and a design table 140. The plurality of applications 110 are installed or stored in the computing device and communicates information regarding their states to the design management component 120. The design management component 120 may use the information from the applications 110 and the design table 140 and send application information 150 to the presentation component 130. The presentation component 130 generates and displays one or more user interface features.

In some embodiments, the plurality of applications 110 can include applications use for messaging (e.g., SMS, MMS, instant messages, or other types), web browsing, media playback, personal information management (e.g., such as contact records management, calendar applications, tasks scheduling and lists), image or video/media capture, games, and other applications providing various other functionalities. Other applications can include social networking applications (such as FACEBOOK or TWITTER), banking or finance applications, newspaper applications, or e-book applications. Users may download various additional applications from an application store and install them on their computing devices. Depending on user input with respect to the applications 110, each of the plurality of applications 110 can communicate their state information to the design management component 120.

The design table 140 stores a table associating each of the applications 110 with a corresponding design scheme. Whenever a user downloads a new application, the application is associated with a corresponding design scheme and this information is stored in the design table 140. Applications 110 originally provided by the computing device are each associated with a corresponding design scheme. Similarly, according to an embodiment, third party developer-provided applications 110 also have a corresponding design scheme selected and/or created by a third party designer or developer of the application 110. An application's 110 design scheme can be found with meta-information associated with the application. In some embodiments, an application 110 may have multiple design schemes that may be selectable by a user.

A design scheme of an application 110 includes various attributes that are seen by a user when the application 110 is launched or opened on the computing device. In some embodiments, the design scheme of a particular application 110 includes various characteristics of the application, such as colors, hues, shading, patterns, designs, and emblems, as well as font and text size, content, background, and borders of the application 110. The design scheme and the overall appearance of an application are pre-determined by the designer and/or creator of the application. For example, when a messaging application is launched and displayed on the display of the computing device, the messaging application may have a border with a particular color, e.g., blue. In addition, the background of the application may be a different shade of blue or grey, for example, with a slight pattern of diagonal lines. Each of the applications 110 has a corresponding design scheme that is associated with it and stored in the design table 140.

Figure 4A:
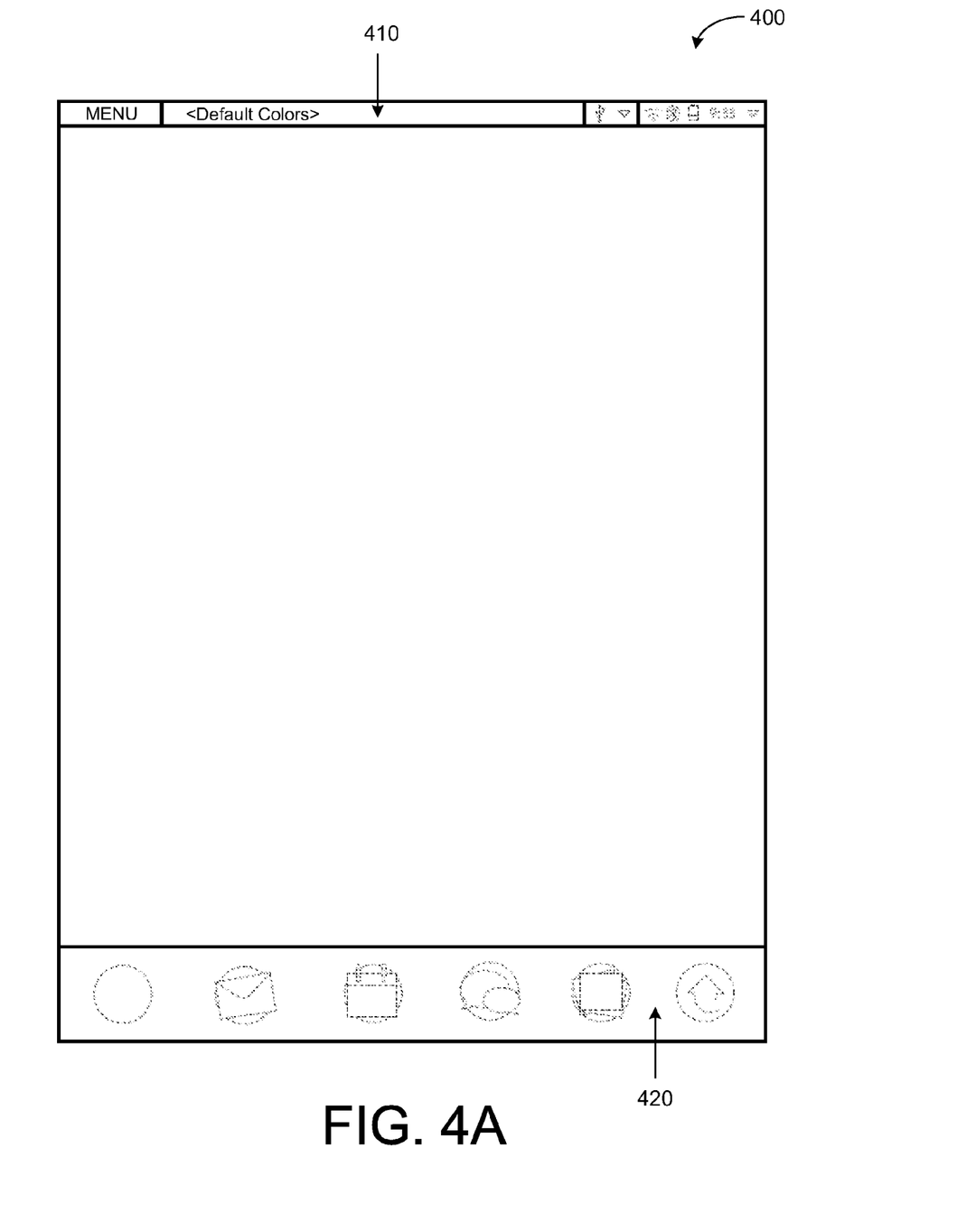
FIGS. 4A-4C illustrate user interface features that are provided on a computing device under an embodiment.
Figure 4B:
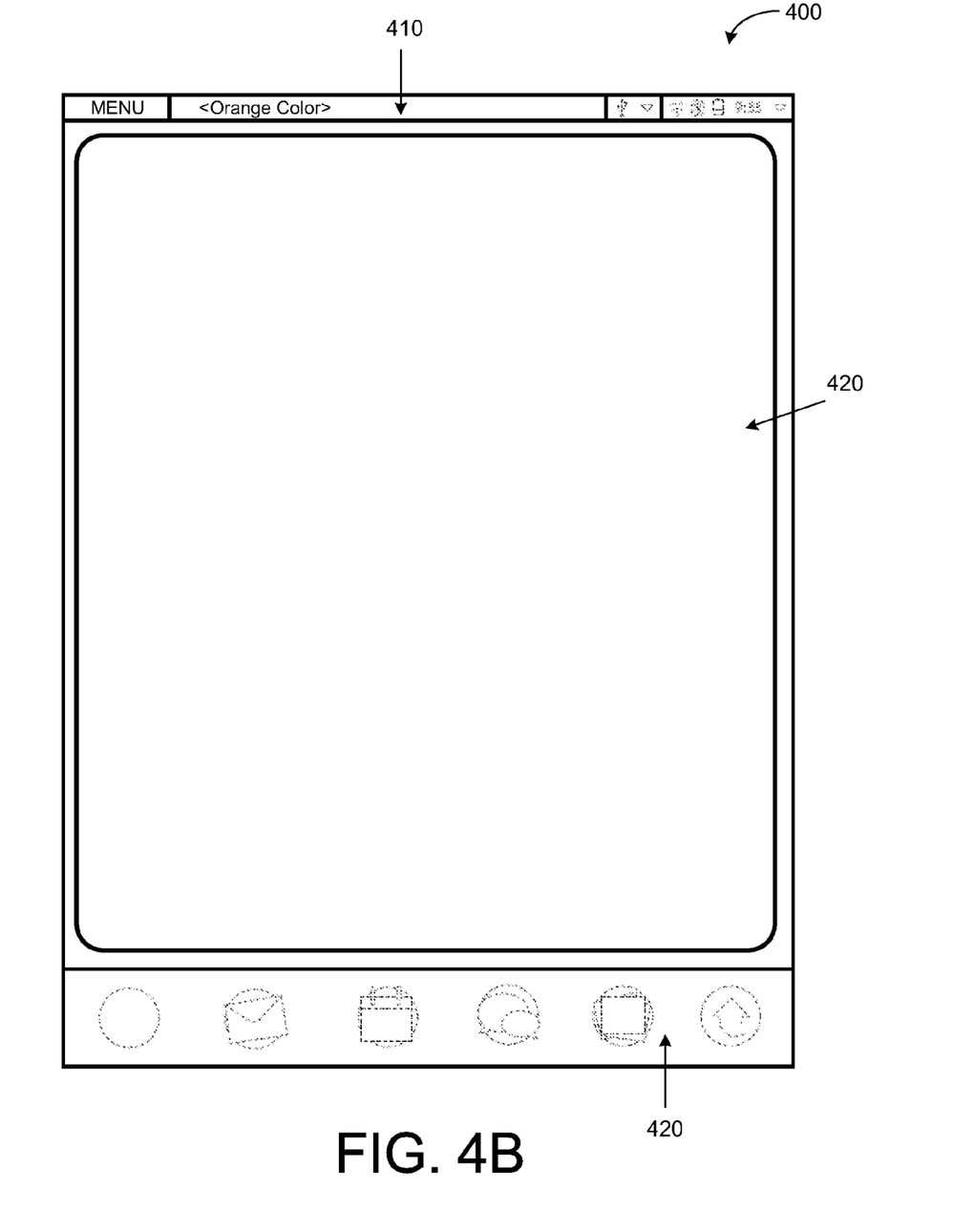
Figure 4C:
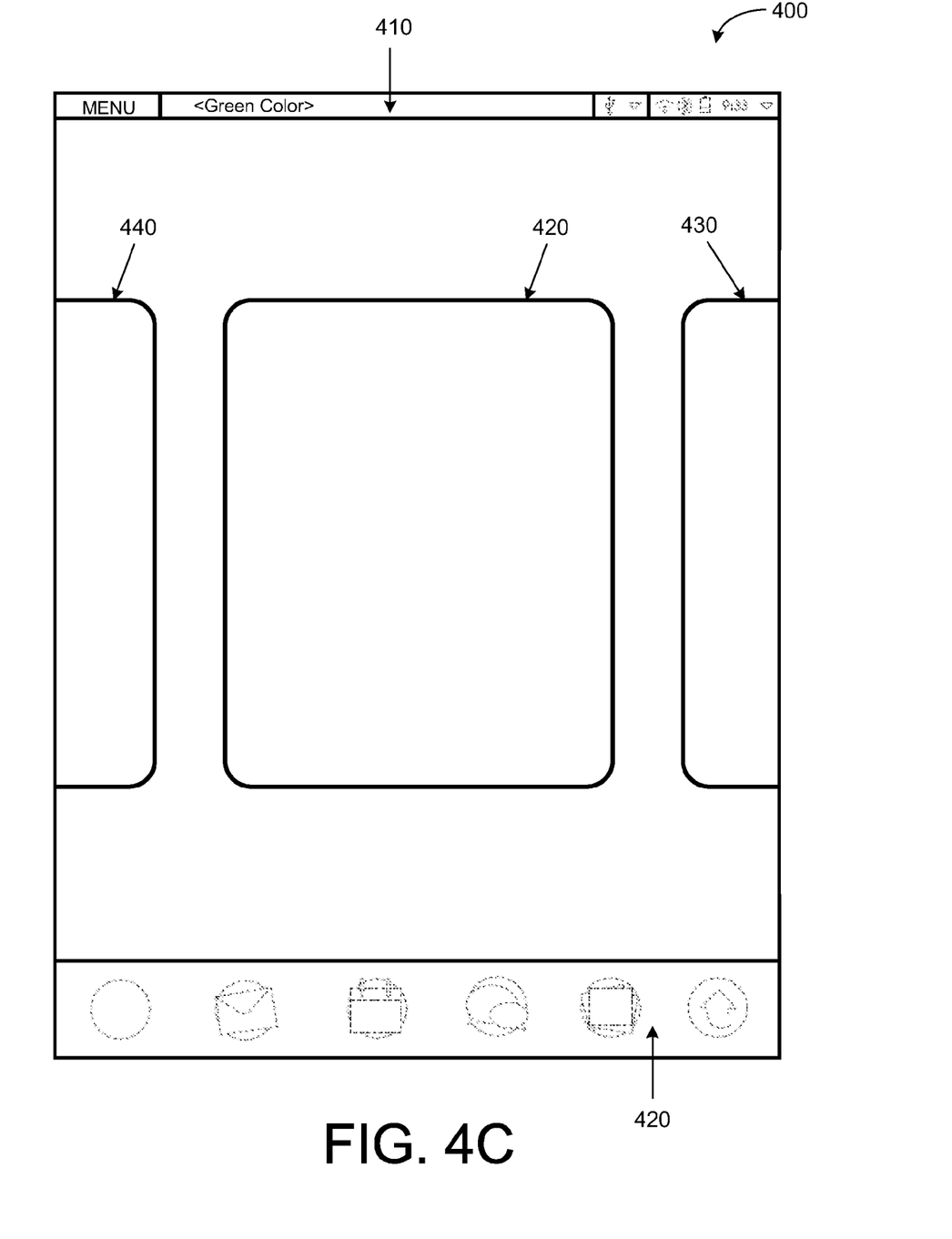

The system 100 also includes a presentation component 130. The presentation component 130 is configured to generate one or more user interface features. A user interface feature is provided on the display of the computing device to enable a user to input selections and interact with the device. The user interface features are presented on the display independent of the applications 110 that are stored or installed in the device. In some embodiments, a user interface feature may be a status or notification bar. An example of a status bar is illustrated in FIGS. 4A-4C.

The status bar (e.g., user interface feature) may be presented in different locations of the display of the computing device (e.g., at a top, bottom, left or right portion of the display). According to an embodiment, the location of the status bar may be affected by the orientation of the computing device. Many devices can be operated in either a landscape or a portrait mode, depending on, for example, a manner in which a user holds the computing device.

The status bar may provide a variety of information to a user. In one or more embodiments, the status bar may include selectable icons or graphic images that represent time and date, network connectivity, power/battery life, or notifications received from one or more applications 110. A user may select various icons or graphic images to cause the computing device to display other windows and/or applications. For example, when the user selects the network connectivity icon, a window may appear showing what connections are active (e.g., Wi-Fi active or on, or Bluetooth active or on).

In some embodiments, the status bar may also include a portion that displays text corresponding to the application that is currently being accessed or used by a user. The text corresponding to the application may be selectable to access a menu of the particular application. On the other hand, if no application is currently being accessed or used, the portion may include text corresponding to an overall menu of the computing device. If a user selects the menu, another window may appear and provide a user with more options to interact with or access the mobile computing device.

In other embodiments, a user interface feature may be an application bar. An example of an application bar is illustrated in FIGS. 4A-4C. The application bar provides a plurality of application objects (e.g., icons or graphic images that correspond to the applications) that are selectable by a user. A user may select an application object to open or launch the application.

A user interface feature, such as a status bar or an application bar, may have a default appearance and/or color scheme. The status bar may have a solid color or transparent/translucent, a shaded color, different colors, different patterns, etc. In some embodiments, a user may set or choose the default appearance and/or color schemes of the user interface features. For example, a user may have the option to select a theme or color theme for the computing device. If the user selects an ocean theme or blue color theme for his or her computing device, a variety of different user interface features may have colors and/or appearances that correlate or match the theme (e.g., the status bar may be light blue, while the background is a darker blue with waves).

In other embodiments, a developer for third party applications may be enabled to generate a design scheme (e.g., choose and set the appearance and/or color scheme) for the user interface features. For example, a developer of a banking application, which allows a user to access his or her banking accounts from the computing device, may be enabled to generate a design scheme for the status bar of the user's computing device. Depending on the design scheme associated with the banking application, the developer may generate a design scheme for the status bar so that the status bar matches or complements the design scheme of the banking application.

The system 100 also includes a design management component 120 that communicates with a plurality of applications 110 and the design table 140. The design management component 120 is configured to detect a change in a state of an application 110 and communicate application information 150 to the presentation component 130. The applications 110 that are stored in the computing device may be in a variety of different states. For example, an application may be (i) closed, (ii) opened or launched and currently used or operated on by the user, or (iii) opened or launched, but not used or operated on by a user. Other states are possible, such as an application being out of focus (e.g., partially hidden or partially minimized, for example), or an application that is hidden from the display screen. In some embodiments, the design management component 120 detects what state each application is in and detects if there is a change in one or more applications.

Based on the change of the state of an application, the design management component 120 communicates application information 150 to the presentation component 130. Application information 150 may include information corresponding to an application whose state has changed and the state information of that application. For example, a variety of applications may be stored in the computing device and each application may correspond to an application object (e.g., an icon). A user may launch or open an email application by selecting (through user input) the corresponding application object. Upon launching or opening the email application, the design management component 120 detects that a change in the state of the email application has occurred.

Upon launching or opening the email application, the design management component 120 detects that the state of the email application has changed from a closed state to an opened or launched state. The design management component 120 then communicates application information 150 regarding the email application and the state of the email application to the presentation component 130. The application information 150 also includes design scheme information corresponding to the email application (received from the design table 140). Depending on the state of the email application, the presentation component 130 affects the appearance of one or more displayed user interface features (e.g., a status bar) based on the design scheme associated with the email application.

Upon receiving application information 150 that the email application is being used by the user, the presentation component 130 affects the appearance of the user interface features. In one embodiment, the appearance of the status bar is modified or altered so that it matches or complements design scheme of the email application. For example, if the email application design scheme has a certain pattern or shading of light green around the borders and/or background of the application, the presentation component 130 may change the appearance and/or the colors of the status bar so that it is a darker green to match or complement the email application design scheme. In other embodiments, depending on the design scheme of an application, the appearance of the user interface features may be altered to match or complement various characteristics of the application design scheme, such as colors, hues, shading, patterns, designs, and emblems, as well as font and text size, content, background, and borders of the application. The appearance of the status bar is altered in this manner to make the status bar aesthetically pleasing to the user.

When the user closes the email application after using it, or brings the email application out of focus, for example, the design management component 120 detects that the state of the email application has changed again. This information is communicated to the presentation component 130 and the presentation component 130 again automatically alters the appearance of the displayed user interface features. For example, in response to the email application being closed or being brought out of focus, the status bar changes appearance from the dark green color to another color, such as the default colors and/or appearance of the status bar.

Similarly, in some embodiments, if the user is accessing an email application and opens or launches another application (e.g., a calendar application), the email application is automatically brought out of focus. The design management component 120 detects that the state of the email application has changed from being used by the user to being out of focus, and also detects that the calendar application has changed states from being closed to being opened/launched. Application information 150 corresponding to the email application and calendar application (and their respective states) is communicated from the design management component 120 to the presentation component 130. The presentation component 130 then alters the appearance and/or colors of the status bar from the appearance it was in (e.g., from matching the email application design scheme) to matching the calendar application design scheme. If the design scheme of the calendar application includes a border that is red in color and textured, for example, the appearance of the status bar is changed to match or complement the red and textured design scheme of the calendar application. Examples of the user interface features and applications are discussed with reference to FIGS. 4A-4C below.

Figure 2:
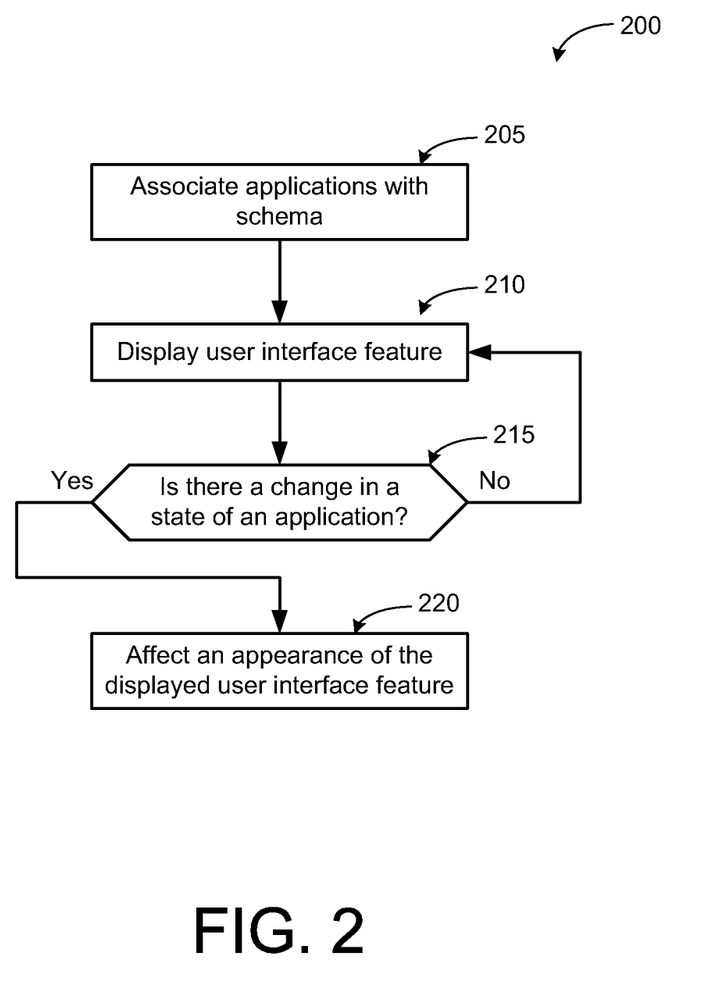
FIG. 2 illustrates a method for operating a computing device under an embodiment.

FIG. 2 illustrates a method for operating a computing device under an embodiment. A method such as described with FIG. 2 may be implemented using, for example, elements shown and described with FIG. 1. As such, references to elements of FIG. 1 are intended to illustrate only suitable elements for performing a step or sub-step being described.

In one embodiment, the flow chart 200 of FIG. 2 represents an exemplary method in which a user interface feature is displayed on a computing device and is then altered based on a design scheme associated with an application. In step 205, each of the applications that are stored or installed in the computing device is associated with a corresponding design scheme. As discussed, in various embodiments, a design scheme of a particular application includes various characteristics, such as colors, hues, shading, patterns, designs, and emblems, as well as font and text size, content, background, and borders of the application. In some embodiments, a third party applications developer may be enabled to generate a design scheme for the user interface features.

At step 210, the presentation component 130 displays one or more user interface features on the display of the computing device. The user interface features may be present independent of the operation of the plurality of applications stored in the computing device. A displayed user interface feature may be a status or notification bar, or an application bar.

According to an embodiment, the design management component 120 detects whether there is a change in a state of one or more applications (step 215). If there is no change in the state of any application (e.g., none are opened from being closed, none are closed from being opened, or none are minimized, etc.) the displayed user interface features are not altered. However, as discussed, when a state of an application is changed from being closed (not opened) to being launched so that a user can use the application, for example, the design management component 120 detects that a change has occurred. Similarly, if the state of an application is changed from being accessed by a user to being closed, the design management component 120 detects this change. Once the design management component 120 detects a change, application information 150 corresponding to the applications are communicated to the presentation component 130 to affect the appearance of the displayed user interface feature (step 220).

As discussed, in some embodiments, a third party developer is enabled to generate a design scheme for a user interface feature. If the application that has changed state is a third party developed application, and the third party developer generated a design scheme for the status bar to match or complement the developed application, upon detecting the change in the state of the third party application, the appearance of the status bar is affected based on the design scheme generated by the developer.

In some embodiments, if an application is opened or launched from an off or closed state, the appearance and/or colors of the displayed user interface feature is affected and modified to match or complement the design scheme of the launched application (e.g., match a primary color scheme of the launched application, or match various other characteristics such as shading and hues). In other embodiments, if an application is closed or minimized from an open state in which the user was accessing the application, the appearance and/or colors of the displayed user interface feature is modified to return to a default appearance and/or colors.

Hardware Diagram

Figure 3:
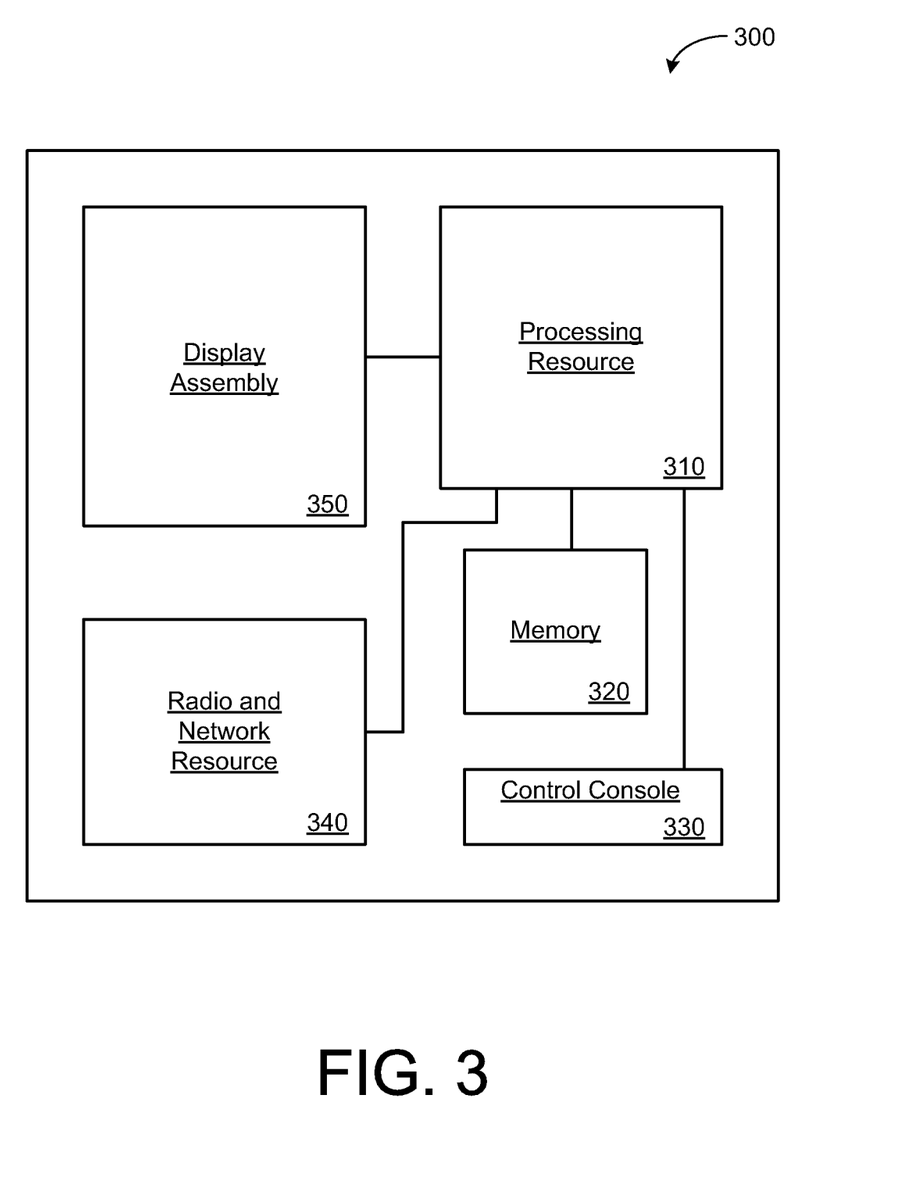
FIG. 3 is a block diagram of a computing device under an embodiment.

FIG. 3 is a block diagram of a computing device for implementing an architecture such as described with FIG. 1, under an embodiment. In FIG. 3, a computing device 300 includes a processing resource 310, one or more memory 320 for storing applications, display features, and data used by the applications (e.g., Flash memory, RAM, hard drive, portable storage units, etc.), a control console 330 for enabling a user to control the device 300 with user inputs, a radio and network resource 340, and a display assembly 350. In some embodiments, the control console 330 can be incorporated or be a part of the display assembly 350.

The processing resource 310 is configured to execute instructions and process data for implementing the system 100 as described with FIG. 1, so that group notifications can be provided on the display assembly 350 of the computing device 300. The radio and network resource 340 enables network connectivity and/or cellular telephony capabilities. The radio and network resource 340 can be configured to enable network connectivity or connectivity with other devices through use of the Wi-Fi protocol (e.g., IEEE 802.11 (b) or (g) standards), Bluetooth protocol, etc.

In one or more embodiments, the display assembly 350 can include a touch screen display to enable a user to control the device 300 by making contact and movements on the touch screen display. The user selections or inputs referred to in FIGS. 1 and 2 can be performed on a touch screen display. Some user inputs can be a tap on a selectable feature or icon on the user interface, or other actions, such as a quick double tap or a gesture (e.g., a drag or swiping motion). As discussed, in some embodiments, a user may change a state of an application through user input. For example, a user may open or launch an application by tapping on an application icon on the display. The user may also make a swiping gesture to move from one opened application to another (e.g., when the applications are not in focus).

User Interface Features

FIGS. 4A-4C illustrate notification bars provided on a display under an embodiment. The illustrations described with FIGS. 4A-4C may be implemented using, for example, elements shown and described with FIGS. 1-3. As such, reference to elements of FIGS. 1-3 is intended for illustration purposes.

FIG. 4A illustrates user interface features that are provided on a computing device under an embodiment. Presentation 400 includes a status bar 410 and an application bar 420. According to an embodiment, the status bar 410 and the application bar 420 are both user interface features that are displayed on the display of a computing device. As described in FIGS. 1-3, the appearance of the status bar 410 may be affected depending on a change of a state of an application. In other embodiments, the appearance of the application bar 420 may be automatically affected instead. The status bar 410 includes a menu on the left portion and a plurality of selectable icons corresponding to different information relating to the computing device. The application bar 420 includes a plurality of different application objects that are selectable in order to launch or open one or more applications.

In FIG. 4A, presentation 400 has no applications that are opened or launched, and no applications that are minimized or out of focus. Because no applications have changed state, the appearance of the status bar 410 is not affected. The colors and the overall appearance of the status bar 410 may be the default colors and/or appearance set by a user or the developer or manufacturer of the computing device.

If a user opens or launches an application, however, the change in the state of the application is detected. In FIG. 4B, an application has been launched and opened, and is being accessed by a user. This is represented by the application 420 being displayed in its full size, for example, on the display of the computing device. Once the change in the state of the application 420 has been detected, the appearance of the status bar 410 is automatically affected. The colors and/or the appearance of the status bar 410 is changed or modified to resemble and/or match and/or complement the design scheme (e.g., the primary color scheme) of the application 420. If the application 420 has a primary color scheme of orange, the status bar 410 may change its appearance to match the orange color scheme of the application 420. In this way, the status bar 410 may be aesthetically pleasing and at the same time, efficiently enable a user to interact with and access the computing device (e.g., icons and menu are still selectable).

In FIG. 4C, a presentation 400 is illustrated with three applications 420, 430 and 440 that are opened, but not being accessed or used by the user. Instead, the three applications are all taken out of focus. For example, in one embodiment, the user may scroll through the out-of-focused applications (left to right, or right to left) to browse the various applications that are opened, but not being currently used. When a user selects one of the applications to access (e.g., brings the application to focus, or maximize the application), such as application 430, the change in the state of the selected application 430 is detected. In response, the status bar 410 may after its colors and/or appearance based on the design scheme of the selected application 430 (e.g., green from orange).

While the examples provided with respect to FIGS. 4A-4C discuss the status bar 410 being changed in appearance, in some embodiments, the appearance of the status bar 410 and/or the application bar 420 are affected based on the design scheme of an application whose state has changed.

Alternate Embodiments

In some embodiments, even if multiple applications are out of focus, the status bar 410 may change its appearance and/or colors depending on which out-of-focus application is currently centered in the display of the computing device (e.g., the state of the out-of-focus application changes depending on the location relative to the center of the display). For example, referring back to FIG. 4C, application 420 is centered, while applications 430, 440 are not. Even though all three applications 420, 430, 440 are out of focus and not currently being used by the user, the appearance of the status bar 410 may be automatically affected to match the design scheme of the application 420. If a user scrolled to the left to center the application 440 (e.g., by making a swiping gesture on a touch screen display), however, the status bar 410 can automatically change appearance to match or complement the design scheme of the application 440.

As discussed, a user interface feature may be present independent of the operation of the plurality of applications. However, in some embodiments, the status bar may be configured to be hidden or be covered when certain applications are being used by a user. For example, in certain gaming applications, the application, when being used, may span the entire display of the computing device so that the status bar or other user interface features are hidden. The status bar or other features may be shown if the user pauses out of the gaming application, or minimizes the gaming application (or makes the application out of focus—but not closed or shut down completely). In this manner, the status bar may after its appearance in response to the application changing state (e.g., user opening or starting or launching the application) and then may subsequently be hidden when the application changes state again (e.g., displayed application changes state to a larger size).

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for operating a smart phone, the method comprising:
    associating a first application, stored in the smart phone, with a first design scheme;
    displaying a status bar on a touch-sensitive display of the smart phone, the status bar to be displayed independently of operation of any number of applications stored in the smart phone;
    receiving a tapping gesture on a first application icon, displayed on the touch-sensitive display, to launch the first application;
    in response to receiving the tapping gesture to launch the first application, altering an appearance of the status bar by adding a background pattern to the status bar in accordance with the first design scheme;
    receiving a tapping gesture on a second application icon, displayed on the touch-sensitive display, to launch a second application, the second application displaying a user interface spanning an entirety of the touch-sensitive display and being associated with a second design scheme; and
    in response to detecting one or more of a pause or a minimization of the second application, displaying the status bar as altered in accordance with the second design scheme.

2. A method for operating a smart phone, the method comprising:
    associating a first application, stored in the smart phone, with a first design scheme;
    displaying a status bar on a touch-sensitive display of the smart phone, the status bar to be displayed independently of operation of any number of applications stored in the smart phone;
    receiving a tapping gesture on a first application icon, displayed on the touch-sensitive display, to launch the first application;
    in response to receiving the tapping gesture to launch the first application, altering an appearance of the status bar by changing a background color scheme of the status bar in accordance with the first design scheme;
    receiving a tapping gesture on a second application icon, displayed on the touch-sensitive display, to launch a second application, the second application displaying a user interface spanning an entirety of the touch-sensitive display and being associated with a second design scheme; and
    in response to detecting one or more of a pause or a minimization of the second application, displaying the status bar as altered in accordance with the second design scheme.

3. The method of claim 1, further comprising:
    detecting a user input to close the first application; and
    in response to detecting the user input, reverting the appearance of the status bar to an original design scheme.

4. The method of claim 1, further comprising:
    detecting a user input to reopen the first application; and
    in response to detecting the user input, reverting the appearance of the status bar from the second design scheme to the first design scheme.

5. The method of claim 1, wherein the first design scheme is preselected by a developer of the first application.

6. The method of claim 1, wherein altering the appearance of the status bar includes adding an emblem to the status bar in accordance with the first design scheme.

7. A smart phone comprising:
    a touch-sensitive display;
    one or more processors; and
    one or more memory resources storing instructions that, when executed by the one or more processors, cause the smart phone to:
        associate a first application, stored in the one or more memory resources, with a first design scheme;
        display a status bar on the touch-sensitive display of the smart phone, the status bar to be displayed independently of operation of any number of applications stored in the one or more memory resources;
        receive a tapping gesture on a first application icon, displayed on the touch-sensitive display, to launch the first application;
        in response to receiving the tapping gesture to launch the first application, alter an appearance of the status bar by adding a background pattern to the status bar in accordance with the first design scheme;
        receive a tapping gesture on a second application icon, displayed on the touch-sensitive display, to launch a second application, the second application displaying a user interface spanning an entirety of the touch-sensitive display and being associated with a second design scheme; and
        in response to detecting one or more of a pause or a minimization of the second application, display the status bar as altered in accordance with the second design scheme.

8. A smart phone comprising:
    a touch-sensitive display;
    one or more processors; and
    one or more memory resources storing instructions that, when executed by the one or more processors, cause the smart phone to:
        associate a first application, stored in the one or more memory resources, with a first design scheme;
        display a status bar on the touch-sensitive display of the smart phone, the status bar to be displayed independently of operation of any number of applications stored in the one or more memory resources;
        receive a tapping gesture on a first application icon, displayed on the touch-sensitive display, to launch the first application;

in response to receiving the tapping gesture to launch the first application, alter an appearance of the status bar by changing a background color scheme of the status bar in accordance with the first design scheme;

receive a tapping gesture on a second application icon, displayed on the touch-sensitive display, to launch a second application, the second application displaying a user interface spanning an entirety of the touch-sensitive display and being associated with a second design scheme; and in response to detecting one or more of a pause or a minimization of the second application, display the status bar as altered in accordance with the second design scheme.

9. The smart phone of claim 7, wherein the instructions, when executed by the one or more processors, further cause the smart phone to:

detect a user input to close the first application; and in response to detecting the user input, revert the appearance of the status bar to an original design scheme.

10. The smart phone of claim 7, wherein the instructions, when executed by the one or more processors, further cause the smart phone to:

detect a user input to reopen the first application; and in response to detecting the user input, revert the appearance of the status bar from the second design scheme to the first design scheme.

11. The smart phone of claim 7, wherein the first design scheme is preselected by a developer of the first application.

12. The smart phone of claim 7, wherein execution of the instructions to alter the appearance of the status bar causes the smart phone to add an emblem to the status bar in accordance with the first design scheme.

13. A non-transitory computer readable medium storing instructions that, when executed by one or more processors of a smart phone, cause the smart phone to:

associate a first application, stored in the smart phone, with a first design scheme;

display a status bar on a touch-sensitive display of the smart phone, the status bar to be displayed independently of operation of any number of applications stored in the smart phone;

receive a tapping gesture on a first application icon, displayed on the touch-sensitive display, to launch the first application;

in response to receiving the tapping gesture to launch the first application, alter an appearance of the status bar by adding a background pattern to the status bar in accordance with the first design scheme;

receive a tapping gesture on a second application icon, displayed on the touch-sensitive display, to launch a second application, the second application displaying a user interface spanning an entirety of the touch-sensitive display and being associated with a second design scheme; and in response to detecting one or more of a pause or a minimization of the second application, display the status bar as altered in accordance with the second design scheme.

14. The non-transitory computer readable medium of claim 13, wherein the instructions, when executed by the one or more processors, further cause the smart phone to:

detect a user input to close the first application; and in response to detecting the user input, revert the appearance of the status bar to an original design scheme.

15. The non-transitory computer readable medium of claim 13, wherein the instructions, when executed by the one or more processors, further cause the smart phone to:

detect a user input to reopen the first application; and in response to detecting the user input, revert the appearance of the status bar from the second design scheme to the first design scheme.

16. A non-transitory computer readable medium storing instructions that, when executed by one or more processors of a smart phone, cause the smart phone to:

associate a first application, stored in the smart phone, with a first design scheme;

display a status bar on a touch-sensitive display of the smart phone, the status bar to be displayed independently of operation of any number of applications stored in the smart phone;

receive a tapping gesture on a first application icon, displayed on the touch-sensitive display, to launch the first application;

in response to receiving the tapping gesture to launch the first application, alter an appearance of the status bar by changing a background color scheme of the status bar in accordance with the first design scheme;

receive a tapping gesture on a second application icon, displayed on the touch-sensitive display, to launch a second application, the second application displaying a user interface spanning an entirety of the touch-sensitive display and being associated with a second design scheme; and in response to detecting one or more of a pause or a minimization of the second application, display the status bar as altered in accordance with the second design scheme.

* * * * *